United States Patent
Anderson (12)

(10) Patent No.: US 6,657,667 B1
(45) Date of Patent: Dec. 2, 2003

(54) METHOD AND APPARATUS FOR CAPTURING A MULTIDIMENSIONAL ARRAY OF OVERLAPPING IMAGES FOR COMPOSITE IMAGE GENERATION

(75) Inventor: Eric C. Anderson, San Jose, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 08/978,034

(22) Filed: Nov. 25, 1997

(51) Int. Cl.⁷ .............................................. H04N 5/222
(52) U.S. Cl. ............................ 348/333.12; 348/333.11; 348/36
(58) Field of Search ............................. 348/36, 42, 47, 348/50, 218, 333, 588, 333.01, 333.02, 333.05, 333.11, 333.12, 39, 143; 382/284, 294; 396/19–24, 296, 373, 377, 378, 381

(56) References Cited

U.S. PATENT DOCUMENTS 5,138,460 A * 8/1992 Egawa ...................... 348/239
5,481,330 A * 1/1996 Yamasaki .................... 396/60
5,510,830 A * 4/1996 Ohia et al. ................... 348/36
5,528,315 A * 6/1996 Sugiyama .................. 348/714
5,548,409 A * 8/1996 Ohta et al. ................... 348/36
5,666,580 A * 9/1997 Ito et al. .................... 396/335
5,682,197 A * 10/1997 Moghadam et al. .......... 348/36
5,751,350 A * 5/1998 Tanaka ....................... 348/220
5,883,610 A * 3/1999 Jeon .......................... 345/113
5,896,203 A * 4/1999 Shibata ...................... 358/404
6,075,905 A * 6/2000 Herman, et al. ............ 382/284

* cited by examiner

Primary Examiner—Tuan Ho
(74) Attorney, Agent, or Firm—Sawyer Law Group LLP

(57) ABSTRACT

A method and apparatus for capturing a multidimensional array of overlapping images for composite image generation using a camera that includes a viewfinder. This is accomplished by providing a composite image format comprising an N×M array of overlapping images, and allowing the user to sequentially capture the images in the array. When the user attempts to capture one of the images in the array, the overlap ping areas of previously captured images are displayed in the viewfinder to enable the user to align the next image to be captured in the array with the previously captured images.

28 Claims, 13 Drawing Sheets

2x2

3x2

3x3

Post Capture Process

Post Capture Process

Post Capture Process

Live View Processing

METHOD AND APPARATUS FOR CAPTURING A MULTIDIMENSIONAL ARRAY OF OVERLAPPING IMAGES FOR COMPOSITE IMAGE GENERATION

CROSS-REFERENCE TO RELATED APPLICATIONS

This Application is related to U.S. patent application Ser. No. 08/761,301 filed on Dec. 6, 1996, entitled "A Method And System For Assisting A User To Manually Capture Overlapping Images For Composite Image Generation," and assigned to the assignee of the present application.

FIELD OF THE INVENTION

The present invention relates generally to digital imaging devices, such as digital cameras, and more particularly to a method and apparatus for capturing a multidimensional array overlapping images for composite image generation.

BACKGROUND OF THE INVENTION

In the field of photography, a single composite image may be generated from a series of overlapping photographs. There are several types of composite images. For example, a "panorama" is an image created from a series of overlapping photographs that were taken while the camera is rotated less than 360 degrees, while a "virtual world" is created from a series of photographs that were taken while the camera is rotated 360 degrees.

Specialized equipment has typically been required to generate such composite images. This is because the photographs used to generate the composite image must be overlapped in a manner that sufficiently aligns the images both horizontally and vertically. Such alignment is necessary to allow a software program, called a stitcher, to appropriately "stitch" the images together to form the composite image.

The type of extra equipment necessary to align the overlapping images typically includes a tripod and a mechanical alignment device fitted between the camera and a tripod that mechanically rotates the camera into pre-set positions. This equipment enables a user to take a picture at each pre-set position, which automatically provides properly aligned overlapping photographs. After the photographs are taken, they are developed and then scanned into a computer where they are stitched together by the stitcher program.

Although the photographs provided through the use of the extra equipment creates satisfactory composite images, there are several drawbacks to this approach. One drawback is that typical camera owners do not generally travel with a tripod. Therefore, when a user discovers a scene that is a good candidate for a composite image, the user either does not attempt to take overlapping images, or the images that are taken are not properly overlapped to generate the composite image. And even in instances where the user has a tripod, the user may not have the mechanical alignment device, or may not have the expertise to use the device correctly.

Co-pending U.S. application Ser. No. 08/761,301 assigned to the assignee of the present application, discloses a method and system for manually aligning and capturing overlapping images for composite image generation using a digital camera equipped with an LCD (Liquid Crystal Display), or an analog camera equipped with an electric viewfinder. This is accomplished by dividing the LCD or viewfinder of the camera into two zones, where one zone displays a live image and the other zone displays a still image of the overlapping portion of the last captured image. The two zones effectively enables the user to manually align a live image with a still image without the need for alignment equipment Although dividing the viewfinder into two zones is an effective method for generating composite images from overlapping images, the user is limited to capturing only a horizontal or vertical panorama of N images, or more specifically, a one dimensional array (1×N or N×1) of images. In many circumstances the scene the user wishes to capture may not adequately fit into a one-dimensional horizontal or vertical array. In such cases, the user will not be able to capture a group of images that are aligned sufficiently to generate a composite image from the scene.

Accordingly, what is needed is a method and apparatus for assisting a user in manually capturing a multidimensional array of overlapping images for composite image generation. The present invention addresses such a need.

SUMMARY OF THE INVENTION

The present invention provides a method and apparatus for capturing a multidimensional array of overlapping images for composite image generation using a camera that includes a viewfinder. This is accomplished by providing a composite image format comprising an N×M array of overlapping images, and allowing the user to sequentially capture the images in the array. When the user attempts to capture one of the images in the array, the overlapping portions of previously captured images are displayed in the viewfinder to enable the user to align the next image to be captured in the array with the previously captured images.

According to the method and apparatus disclosed herein for capturing a multidimensional array of overlapping images, the user is able capture scenes and images that could not traditionally be captured using one dimensional horizontal or vertical panorama.

DESCRIPTION OF THE INVENTION

The present invention relates to an improvement in user interfaces of digital imaging devices, including digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any digital imaging device which displays images, icons and/or other items, could incorporate the features described herein below and that device would be within the spirit and scope of the present invention. Thus, the present invention is not intended to be limited to the embodiment shown but is to be accorded the widest scope consistent with the principles and features described herein.

The present invention is a method and apparatus for capturing multidimensional arrays of overlapping images for composite image generation.

Figure 1:
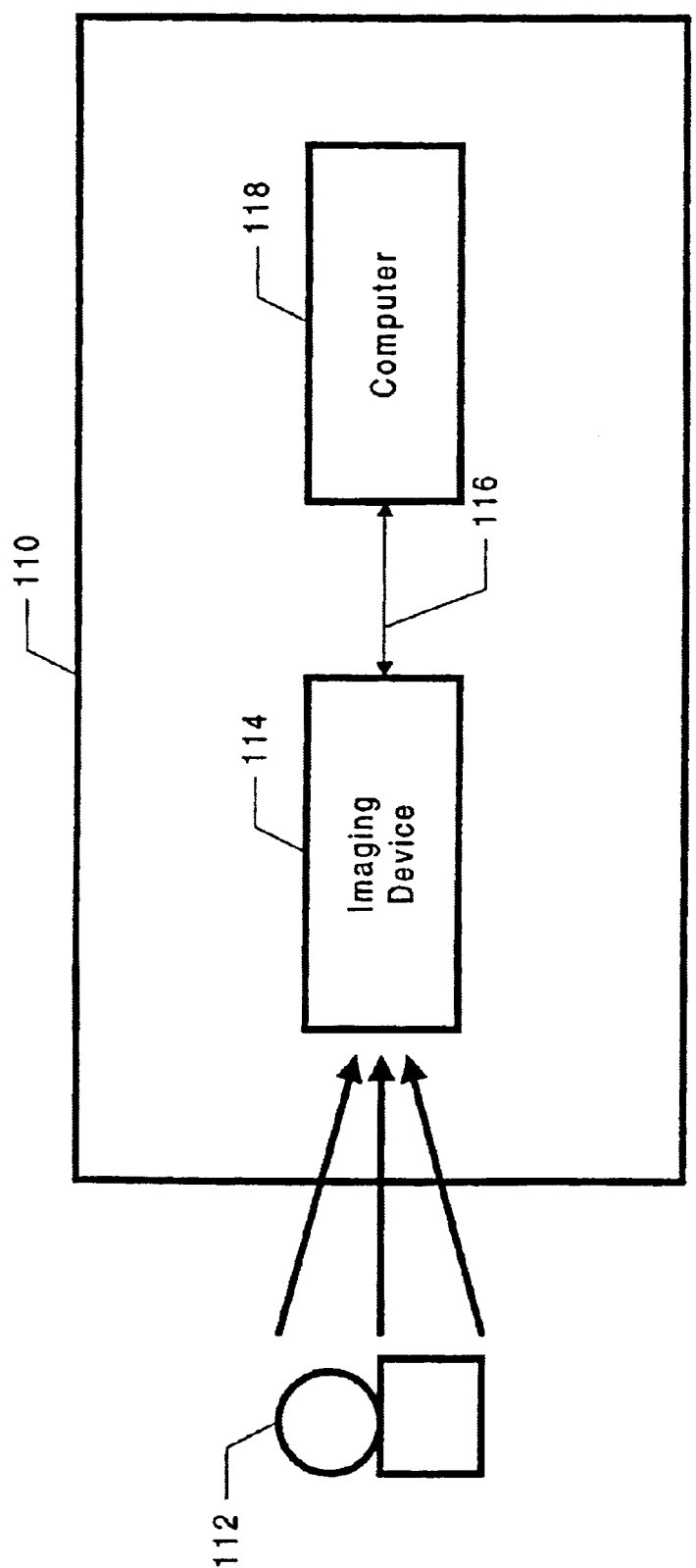
FIG. 1 is a block diagram of a digital camera that operates in accordance with the present invention.

Referring now to FIG. 1, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
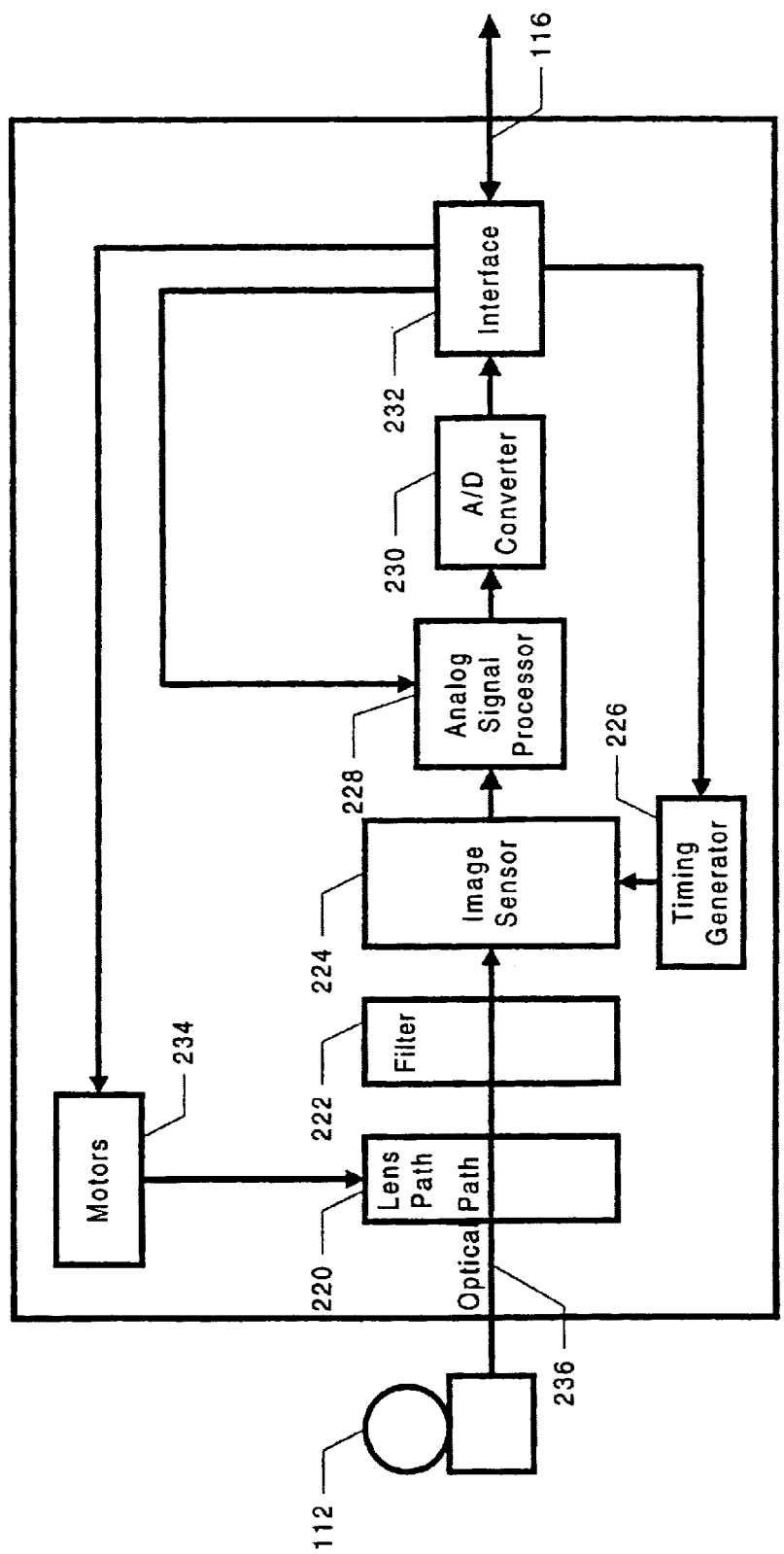
FIG. 2 is a block diagram of an example embodiment for the imaging device of FIG. 1.

Referring now to FIG. 2, a block diagram of an example embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
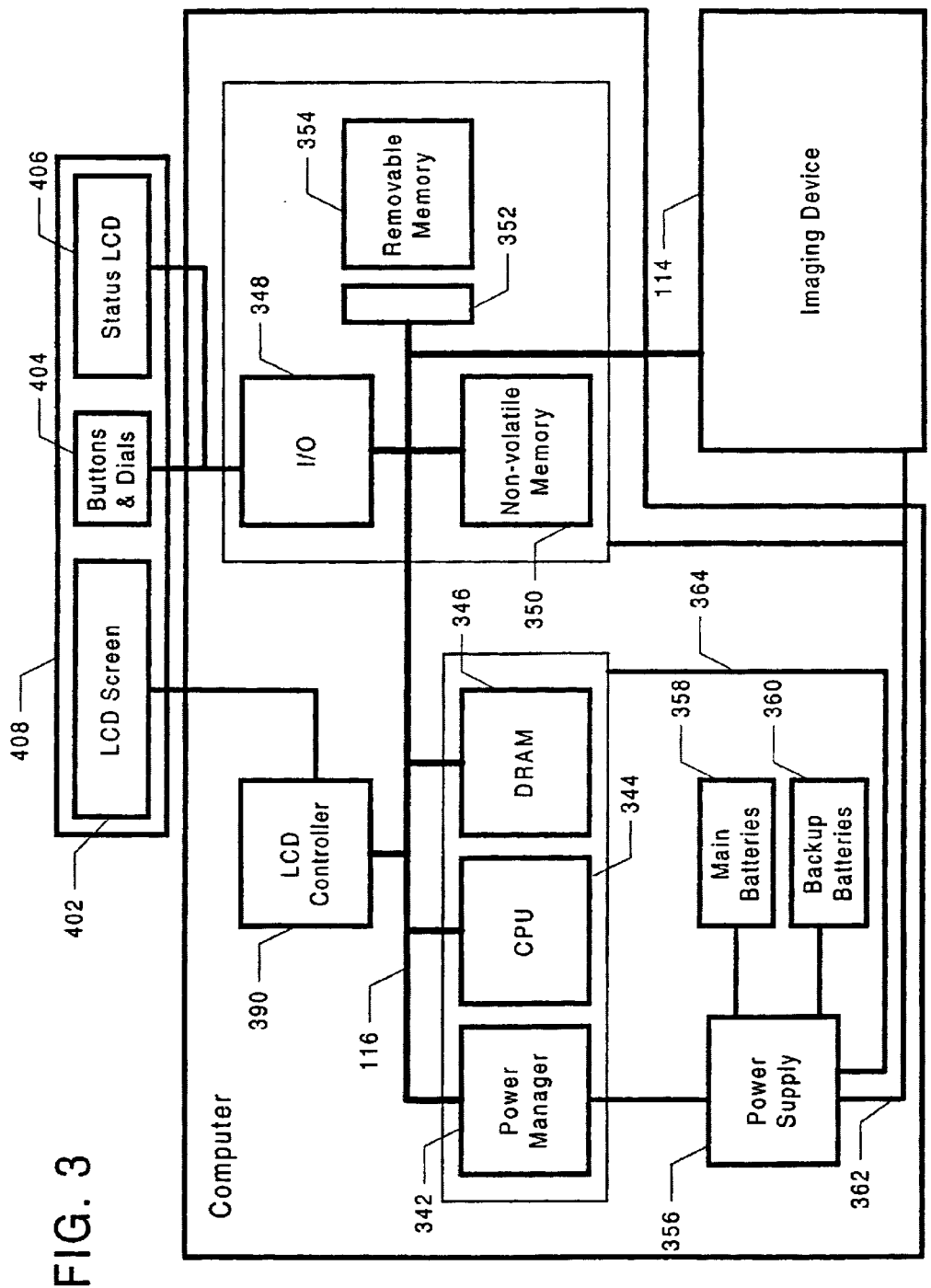
FIG. 3 is a block diagram of an example embodiment for the computer of FIG. 1.

Referring now to FIG. 3, a block diagram of an example embodiment for computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4A:
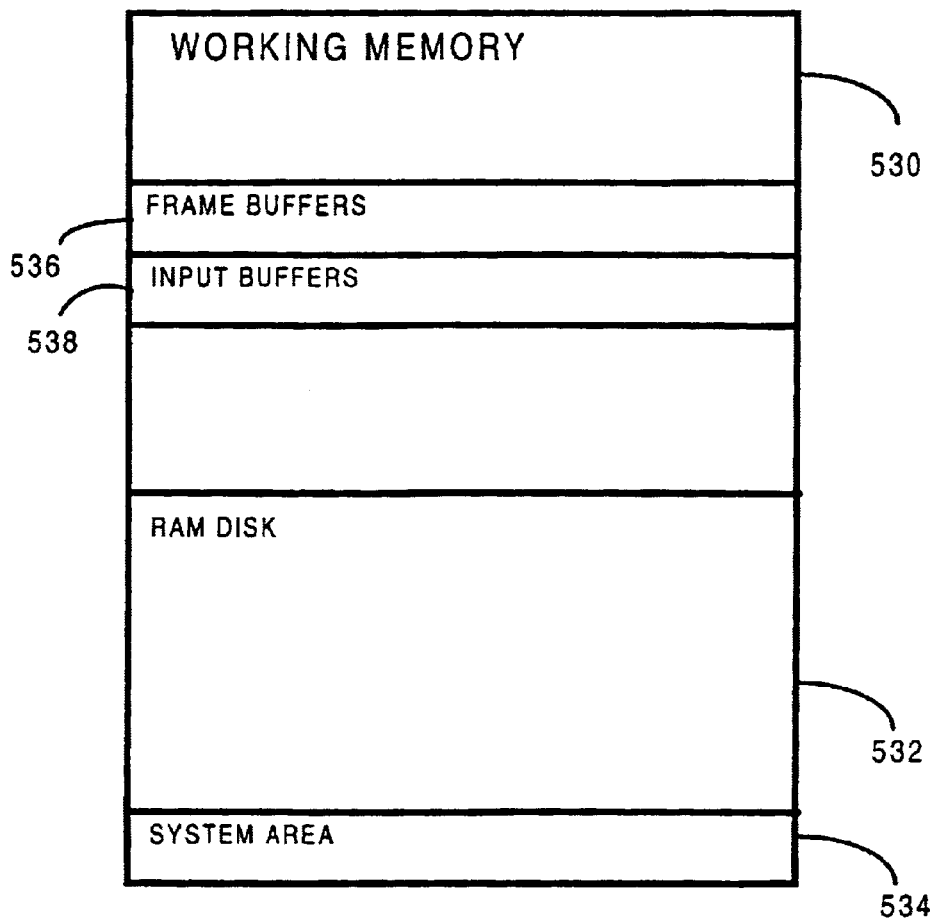
FIG. 4 is a memory map showing an example embodiment of the Dynamic Random-Access-Memory (DRAM).
FIG. 4B is a block diagram showing the contents of input buffers and the frame buffers.

Referring now to FIG. 4A, a memory map showing the preferred embodiment of dynamic random-access-memory (DRAM) 346 is shown. In the preferred embodiment, DRAM 346 includes RAM disk 532, a system area 534, and working memory 530.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes input buffers 538 for initially storing sets of raw image data received from imaging device 114 for image conversion, and frame buffers 536 for storing data for display on the LCD screen 402.

In a preferred embodiment, the conversion process is performed by a live view generation program, which is stored in non-volatile memory 350 and executed on CPU 344. However, the conversion process can also be implemented using hardware. Referring again to FIG. 3, during the execution of the live view generation program (not shown), the CPU 344 takes the raw image data from the input buffers 538 in CCD format and performs color space conversion on the data. The conversions process performs gamma correction and converts the raw CCD data into either a RGB or YCC color format which is compatible with the LCD screen 402. After the conversion, CPU 344 stores the image data in the frame buffers 536. The LCD controller 390 then transfers the processed image data from the frame buffers to the LCD screen 402 (via an optional analog converter) for display.

Figure 4B:
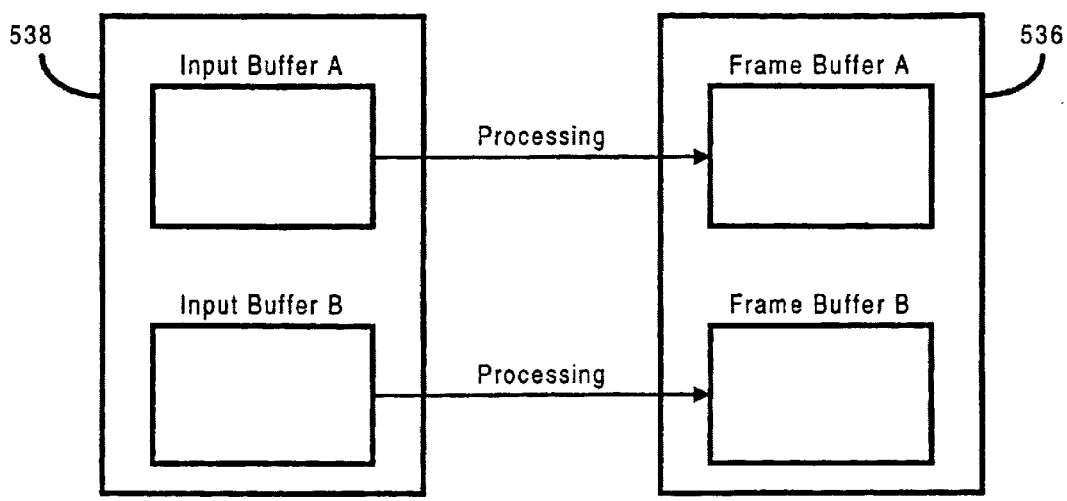

Referring now to FIG. 4B, the contents of input buffers 538 and the frame buffers 536 are shown. In a preferred embodiment, both the input buffers 538 and the frame buffers 536 utilize two separate buffers, called ping-pong buffers, to improve the display speed of the digital camera and to prevent the tearing of the image in the display 402. As shown, input buffers 538 include an input buffer A and an input buffer B, and frame buffers 536 include a frame buffer A and a frame buffer B.

The input buffers A and B alternate between an input cycle and a processing cycle. During the input cycle, the input buffers 538 are filled with raw image data from the image device 114, and during the processing cycle, CPU 344 processes the raw data and transmits the processed data to the frame buffers 536. More specifically, while input buffer A is filling with image data, the data from input buffer B is processed and transmitted to frame buffer B. At the same time, previously processed data in frame buffer A is output to the LCD screen 402 for display. While input buffer B is filling with image data, the data from input buffer A is processed and transmitted to frame buffer A. At the same time, previously processed data in frame buffer B is output to the LCD screen 402 for display.

Figure 5A:
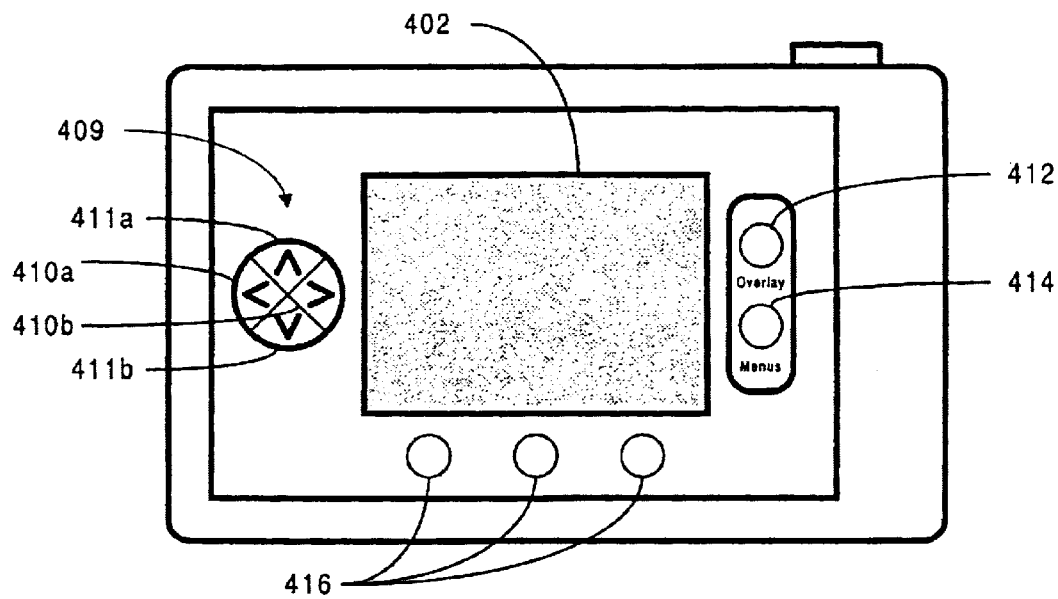
FIGS. 5A and 5B are diagrams depicting the back and top view, respectively, of a digital camera.
Figure 5B:
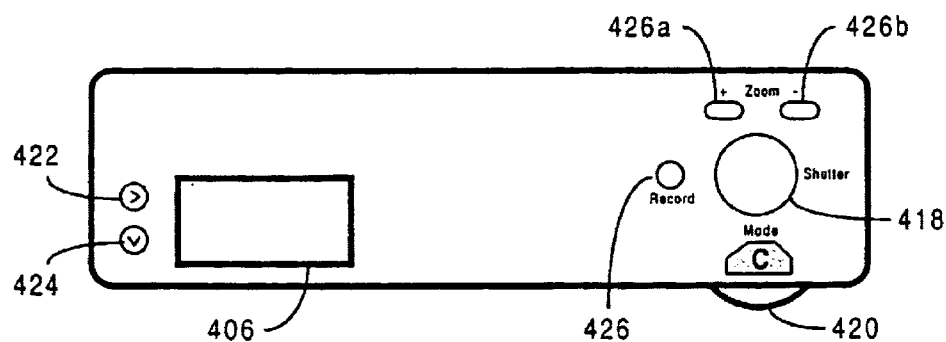

FIGS. 5A and 5B are diagrams depicting the hardware components of the camera's 110 user interface 408. FIG. 5A is back view of the camera 110 showing the LCD screen 402, a four-way navigation control button 409, an overlay button 412, a menu button 414, and a set of programmable soft keys 416. FIG. 5B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426*a* and 426*b*. The user interface 408 may include several different operating modes for supporting various camera functions. Two common modes are a play mode for reviewing captured images, and a capture or record mode for capturing an image through the use of either the LCD screen 402 or the status LCD 406.

A method for assisting a user to manually capture overlapping images for composite image generation has been disclosed in co-pending U.S. patent application Ser. No. 08/761,301, which is assigned to the assignee of the present application. Applicant hereby incorporates the co-pending application by reference, and reproduces a portion of the application herein for convenience.

Figure 6A:
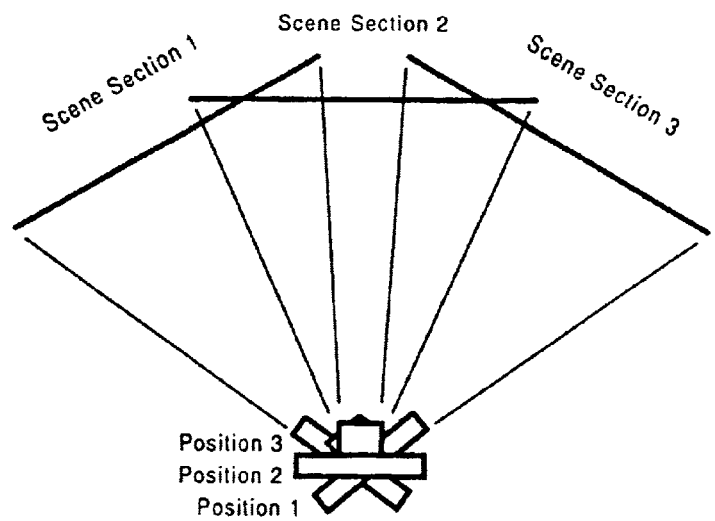
FIGS. 6A and 6B are diagrams illustrating the capture of a series of overlapping images by a camera for use in composite image generation.
Figure 6B:
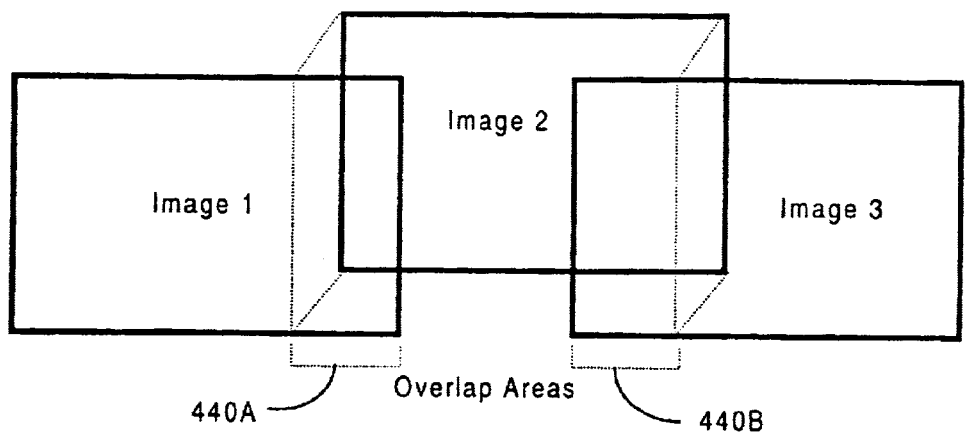

FIGS. 6A and 6B are diagrams illustrating the capture of a series of overlapping images by a camera for use in composite image generation. FIG. 6A is a top view showing the camera rotated into three positions to capture three corresponding images. FIG. 6B shows the area of overlap 440*a* between image 1 and image 2, and the area of overlap 440*b* between image 2 and image 3. In a preferred embodiment, the generation of a composite image from overlapping images typically requires an overlap area 440 of approximately twenty-five percent between two images.

The invention disclosed in Co-pending U.S. application Ser. No. 08/761,301 enables a user to suitably align and capture overlapping images for composite image generation without extra equipment by dividing the LCD 402 of the camera into two zones. One zone displays a live image and the other zone displays a still image of the overlapping portion of the last captured image. Although this enables the user to manually align the live image with the still image without the need for alignment equipment, such as a tripod etc., the user is limited to capturing a horizontal or vertical panorama of N images, which is a one dimensional array (1×N or N×1) of images. For example, FIGS. 6A and 6B show a capture sequence that results in one row of three images, or a 1×3 panorama. In many circumstances, however, the scene the user wishes to capture may not adequately fit into a one-dimensional horizontal or vertical array. In such cases, the user will not be able to generate a composite image from the scene.

The present invention enables a user to manually capture a multidimensional array of overlapping images for use in composite image generation, rather than a one dimensional array. This is accomplished by providing a composite image format comprising an N×M array of overlapping images, and allowing the user to sequentially capture the images in the array. When a user attempts to capture one of the images in the array, the overlapping portions of previously captured adjacent images are displayed in the LCD to enable the user to align the live view image with neighboring images in the array. Although the present invention will be explained with reference to the digital camera described herein, one with ordinary skill in the art will recognize that the method and apparatus of the present invention is also applicable to a conventional analog camera equipped with an electric viewfinder.

Figure 7A:
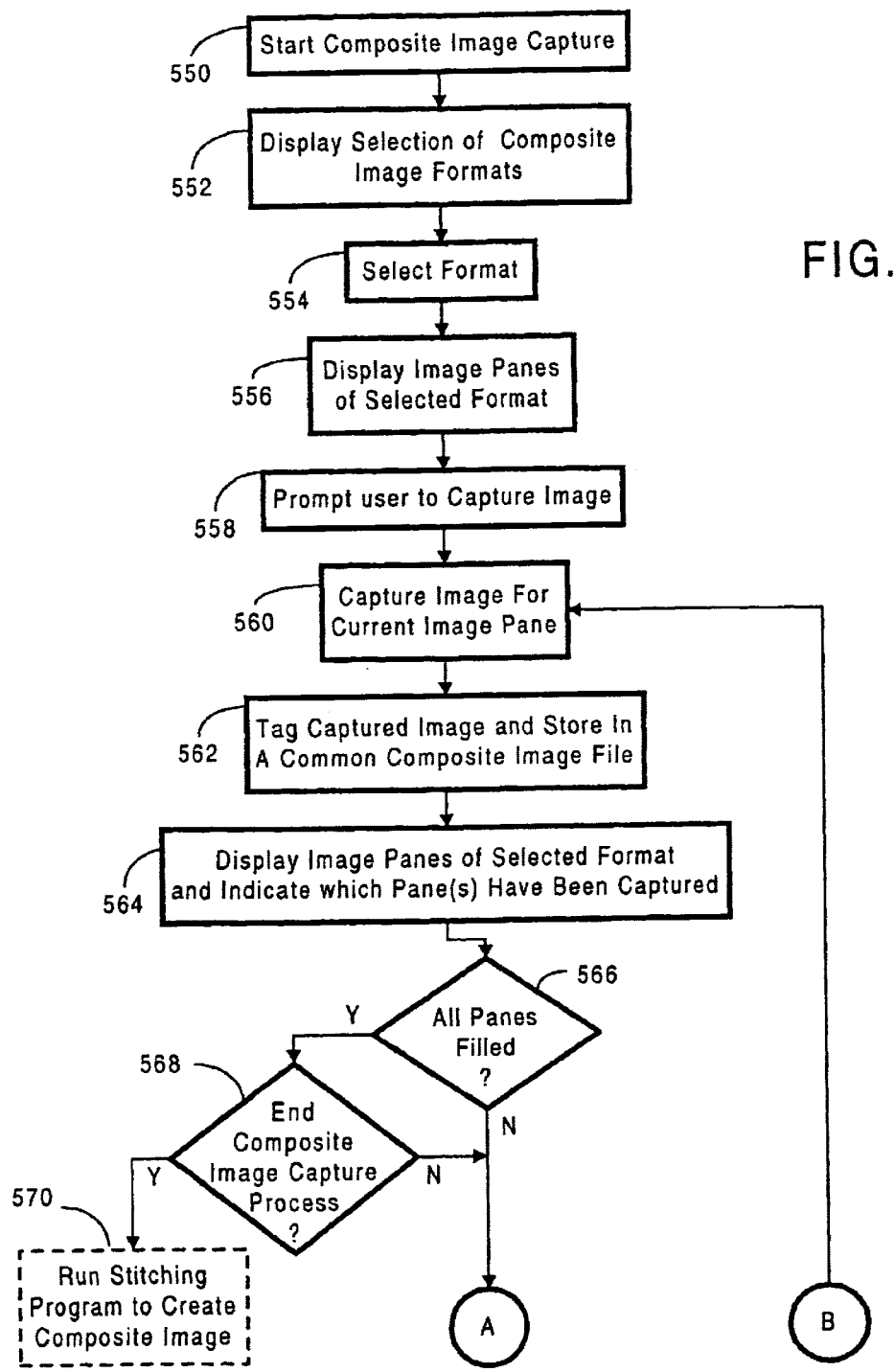
FIGS. 7A and 7B illustrate a flow chart depicting the process of capturing a multidimensional array of overlapping images for composite image generation in accordance with the present invention.
Figure 7B:
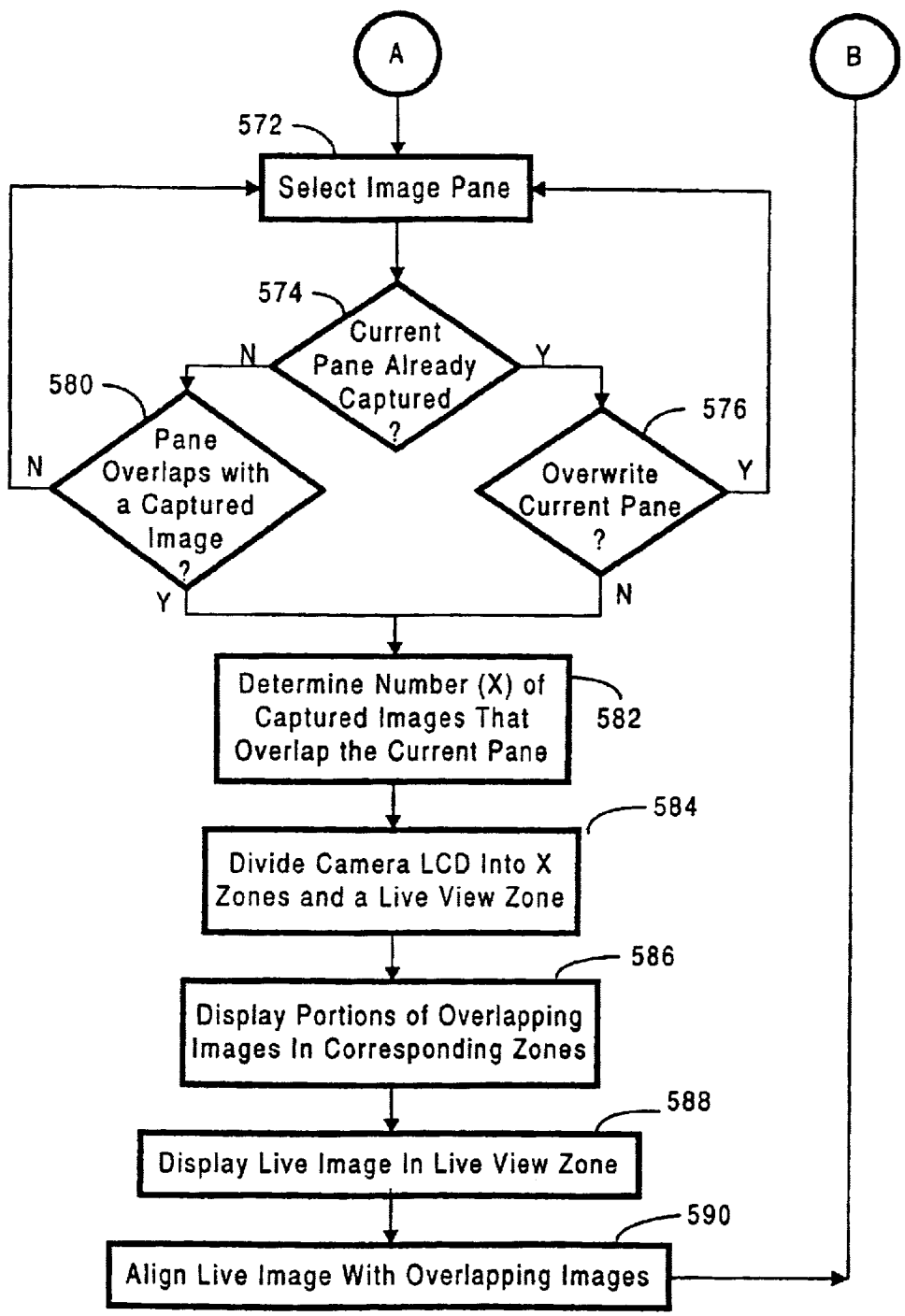

FIGS. 7A and 7B illustrate a flow chart depicting the process of capturing a multidimensional array of overlapping images for composite image generation in a preferred embodiment of the present invention. The process begins when a user depresses a function button on the camera to start the composite image capture process in step 550. The digital camera will then display a selection of various composite image formats from which the user may select in step 552.

Figure 8:
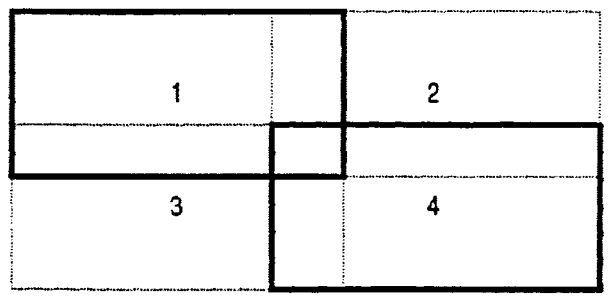
FIG. 8 is a diagram illustrating three example composite image formats each of which includes N×M image panes that correspond to individual image positions.
Figure 8:
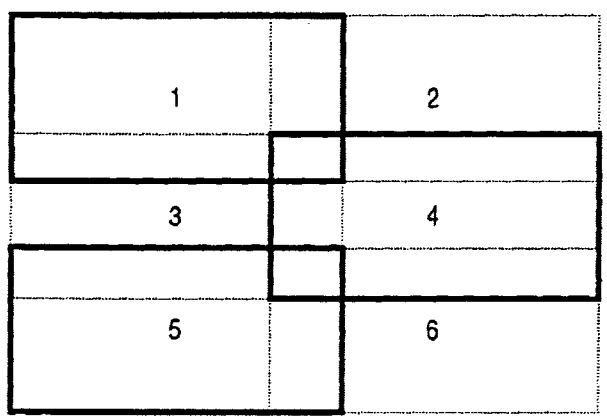
Figure 8:
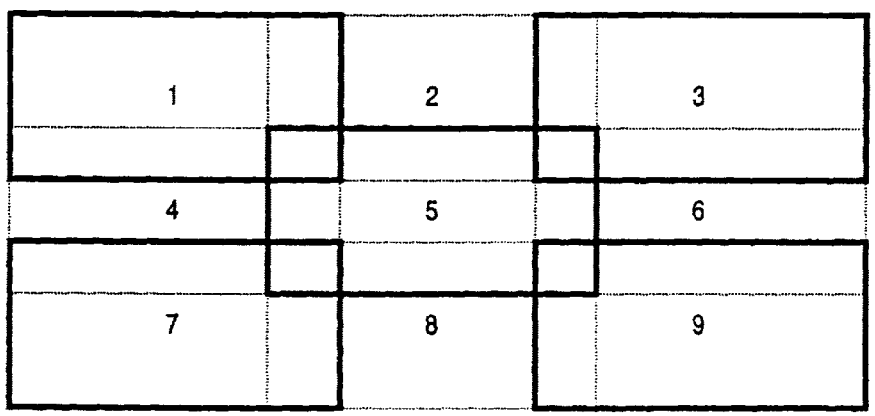

FIG. 8 is a diagram illustrating three example composite image formats. According to the present invention, each format comprises N×M image panes that correspond to individual overlapping image positions, where N=. . . i, and M=. . . p. The examples shown include a 2×2 array comprising two rows of two images, a 3×2 array comprising three rows of two images, and a 3×3 array comprising three rows of three images. Although only horizontally oriented composite image formats are depicted that are taken when the camera is in a landscape position, the camera may also be rotated into a portrait position to provide vertically oriented composite image formats.

Referring again to step 556 in FIG. 7A, in a preferred embodiment, the selection of various composite image formats is displayed using a menu of text and/or icons. After the selection of composite image formats is displayed, the user selects the desired composite image format in step 554. In an alternative embodiment, rather than choosing from a predefined selection of composite image formats, the user may specify a desired composite image format by directly providing values for N and M.

After the desired composite image format is selected, the image panes comprising the selected format are displayed on the LCD 402 in step 556. In a preferred embodiment, the image panes comprising the selected format are displayed similarly to the representations shown in FIG. 8.

The first image position to be captured in the composite image format may be set by default and indicated by highlighting its image pane in the LCD 402. One candidate for the default first image would be the image occupying the upper-left image pane in the composite image format. Alternatively, the user may be allowed to select the first image to be captured by panning around the image panes of the composite image format using the four-way control button 409 (FIG. 5A). The user's selection would then be indicated by either displaying a number, an icon, or by highlighting the selected image pane.

After the first image pane to be captured is indicated, the camera prompts the user to capture the first image in step 558. In response, the user aims the camera at a desired scene and captures the first image of the panorama in step 560.

Figure 9:
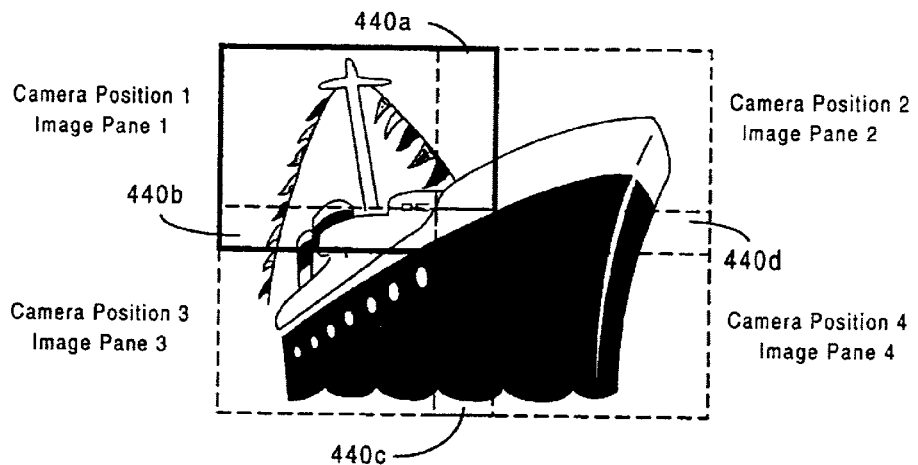
FIG. 9 is a diagram showing an example scene that may be used to create a panorama using a 2×2 array of four overlapping images.
Figure 10A:
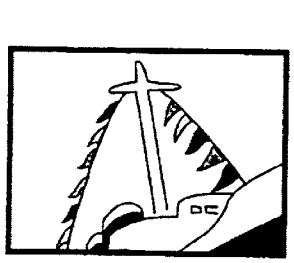
FIGS. 10A–10D are diagrams showing a camera LCD divided into multiple zones in accordance with the present invention.

FIG. 9 is a diagram showing an example scene that may be used to create a panorama using four overlapping images. Although a four image example is used here, a composite image may be made with any number of overlapping images. As shown, the user captures the first image by placing the camera into position 1 so that the first image in the scene appears in the LCD 402, as shown in FIG. 10A.

Referring again to FIG. 7A, after capturing the first image, the image is tagged and stored in a common composite image file for subsequent stitching into a composite image in step 562. The tags associated with each captured image include information necessary for stitching, such the designated composite image format, an identification of which image panes each captured image corresponds to, the order of image capture, the percentage of overlap, and the lens field of view for determining and compensating for distortion.

In a preferred embodiment, each image in the composite image file is stored in JPEG format, and the composite image file itself is stored on removable memory 354 for permanent storage. However, the overlap areas of each image are also kept in memory 346 for reasons explained below. Referring again to FIG. 9 for example, after the first image is captured, the entire image is stored in the composite image file, while its overlap areas 440*a* and 440*b* are also kept in memory 346.

Once the captured image is tagged and stored, the panes of the composite image format are again displayed on the LCD 402 with an indication of which image pane(s) have corresponding captured images in step 564. In a preferred embodiment, the indication is shown by displaying a capture icon or number in the panes that have been captured.

If all the image panes have not been filled with a captured image in step 566, the next image pane to be captured is selected in step 572 (FIG. 7B). In a preferred embodiment, the user may manually select the next image pane to be captured. In an alternative embodiment, the next image pane is selected automatically by the camera. In both embodiments, however, the selected pane, which becomes the current image pane, must overlap with at least one previously captured image in order to properly align the live view image.

If the current pane has already been captured in step 574, then the user is asked if the previously captured image should be overwritten in step 576. If the user indicates that the previously captured image is to be overwritten, then process returns to step 572 for the user to choose a new pane to capture.

If the current pane has not already been captured in step 574, then it is determined whether the corresponding pane overlaps with at least one previously captured image in step 580. If the corresponding pane does not overlap with a previously captured image, then the user is prompted to select an overlapping pane, and the process returns to step 572 for a selection of a new pane to capture.

If the current pane does overlap with a previously captured image, or if the user indicates that the previously captured image is to be overwritten in step 576, then the number (x) of previously captured images that overlap the current pane is determined in step 582. The LCD 402 of the camera is then divided into (x) zones and a live view zone in step 584.

Depending on how many captured panes the current pane overlaps with, the camera LCD 402 is divided into a total of least two zones, and at the most five zones. If the current pane overlaps with only one captured pane, the LCD 402 is divided into two zones, where one zone displays a portion of the previously captured image that overlaps the current image pane and other zone displays a live image of the scene as shown through the camera's imaging device. If the current pane overlaps with four captured panes (e.g., image position 5 in the 3×3 array of FIG. 8), the LCD 402 is divided into five zones, where four zones display the portions of the four previously captured images that overlap the current image pane, and the fifth zone displays a live image of the current image.

According to the present invention, the position of a displayed zone in the LCD 402 corresponds to the position of the previously captured overlapping image relative to the current pane. If a previously captured image is positioned above or below the current pane, then the zone for the previously captured image is positioned adjacent to the top, or to the bottom edge of the LCD 402, respectively. If a previously captured image is positioned to the left or to the right of the current pane, then the zone for the previously captured image is positioned adjacent to the left, or to right edge of the LCD 402, respectively.

After the LCD 402 is divided into x zones, the portions of the images that overlap with the current pane are displayed in their corresponding zones in step 586, while a live image of the next image in the scene is displayed in the live view zone in step 588.

Figure 10B:
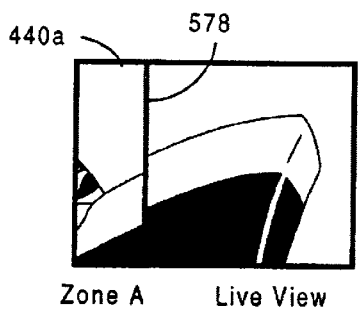

Referring again to FIGS. 9 and 10 for example, after the first image is captured in FIG. 10A, the LCD 402 is divided into zone A and a live view zone, as shown in FIG. 10B. A still image of the overlap area 440*a* of the first image is then displayed in zone A of the LCD 402, and when the user orients the camera into position 2, a live image of the next image in the scene is displayed in the live view zone. It should also be noted that when the overlap areas of an image are stored at full resolution, then the overlap areas must be resized to the typically smaller, lesser resolution LCD 402 before the overlap areas are displayed.

In a preferred embodiment, the zones on the LCD 402 are delineated by a dividing line 578 comprising a series of darkened pixels. The dividing line 578 is shown here as a straight line, but could also be drawn as interlocking cutouts, a diagonal line, or a zig-zag line, for instance. In an alternative embodiment, the dividing line 578 is not displayed, but rather, the overlapping portion of the previously captured image is displayed translucently over the live view image which is displayed across the entire LCD 402.

Referring again to FIG. 7B, after displaying the live image in the live view zone in step 588, the user establishes horizontal and vertical alignment between the live image in the live view zone with the overlapping still images in the other zones in step 590 by altering the position of the camera. After aligning the live image with the still image in step 590, the user captures the image for the current pane in the composite image array in step 560 (FIG. 7A) and the process continues.

Figure 10C:
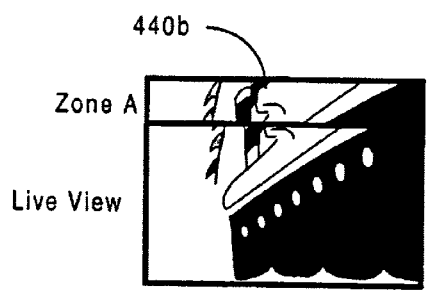

Referring again to the example in FIGS. 9 and 10, FIG. 10C shows what occurs after the user captures the second image from position 2 and image pane 3 becomes the current image pane. The image corresponding to image pane 1 is the only previously captured image that overlaps image pane 3. Since image pane 1 overlaps o image pane 3 from above, the overlap area 440b of image 1 is displayed along the top edge of the LCD 402 in zone A, while a live view of the scene in camera position 3 is displayed in the live view zone.

Figure 10D:
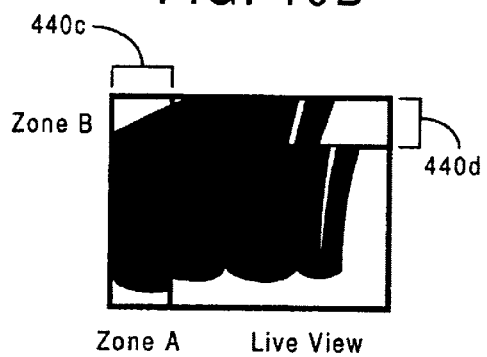

After the user aligns the live view image with the still image in zone A and captures the image for image pane 3, image pane 4 becomes the current image pane. Since image pane 3 overlaps image pane 4 on the left and image pane 2 overlaps image pane 4 from above, the LCD 402 is divided into three zones; zones A and B, and a live view zone, as shown in FIG. 10D. The overlap area 440c of image 3 is displayed along the left edge of the LCD 402 in zone A, and the overlap area 440d of image 2 is displayed along the top edge of the LCD 402 in zone B, while a live view of the scene in camera position 4 is displayed in the live view zone. After the user aligns the live view image with the still images in zones A and B and captures the image for image pane 4, the composite image capture process is complete.

Referring again to FIG. 7A, if all the image panes have been filled with a captured image in step 566, then the user is asked whether to end the composite image capture process in step 568. If the user does wish end the composite image capture process, the user may then optionally run a stitching program either on the camera or on a host computer, which accesses the composite image file containing the captured images and uses the information in the tags to correctly stitch the images into one composite image in step 570. If the user does not wish end the composite image capture process, then the process returns to step 568 so the user may selectively recapture images in the array.

According to the present invention, the dividing of the LCD 402 into x zones and a live view zone is accomplished by accessing the previously captured overlapping images from memory 346, and by dividing the input buffers 538 and the frame buffers 536 (FIG. 4B) into the zones corresponding to those of the LCD 402. This division of the input and frame buffers 538 and 536 is a multi-stage process. When the digital camera is in normal live view mode, the input and frame buffers 538 and 536 are processed as shown with reference to FIG. 4B.

After the user has initiated the composite image sequence, and has then captured the first image in the sequence, a post-capture process is performed on the frame buffers 536 to display the overlap area of the previously captured images in the x zones of the LCD 402. Thereafter, the input buffers 538 and the frame buffers 536 are processed according to a modified live view process to display a view only in the live view zone of the LCD 402. In a preferred embodiment, the input buffers 538 and the frame buffers 536 are processed by the live view generation program running on CPU 344, but could also be processed using well known hardware operating in accordance with the present invention.

FIGS. 11–14 are block diagrams illustrating the post-capture and modified live view processing of the input buffers 538 and the frame buffers 536 in accordance with the present invention. FIGS. 11–14 will be explained with reference to the example composite image process of FIGS. 9 and 10D. Referring to FIG. 10D for instance, the user has just captured image 3 of the composite image array, and the overlap areas of captured images 3 and 2 are displayed in zones A and B, while a live view of image 4 is displayed in the live view zone.

Figure 11:
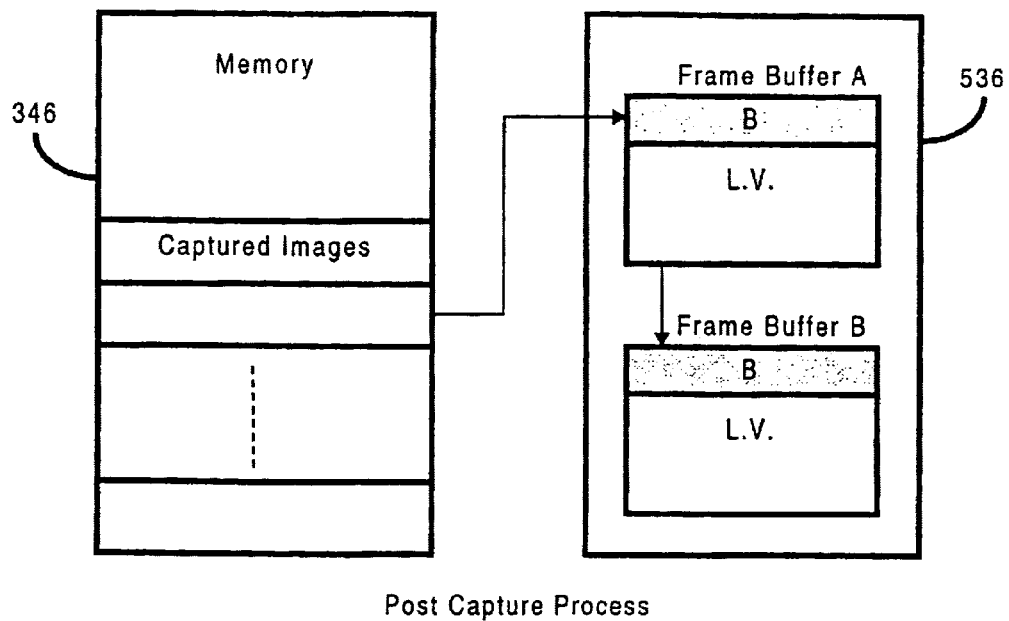
FIGS. 11–14 are diagrams illustrating the processing of the input buffers and frame buffers to support the display of multiple zones in the camera LCD.

FIG. 11 is a diagram illustrating the first step of the post capture process for providing the display shown in FIG. 10D on LCD 402. First, frame buffers A and B are divided into a zone A, a zone B, and a live view zone (L.V.), where zones A and B correspond to two previously captured images that overlap the current pane. Zone A is positioned along the left edge of the frame buffers 536 corresponding to the position of the overlap area of image 3 in relation to image pane 4. And zone B is positioned along the top edge of the frame buffers 536 corresponding to the position of the overlap area of image 2 in relation to image pane 4.

Figure 12:
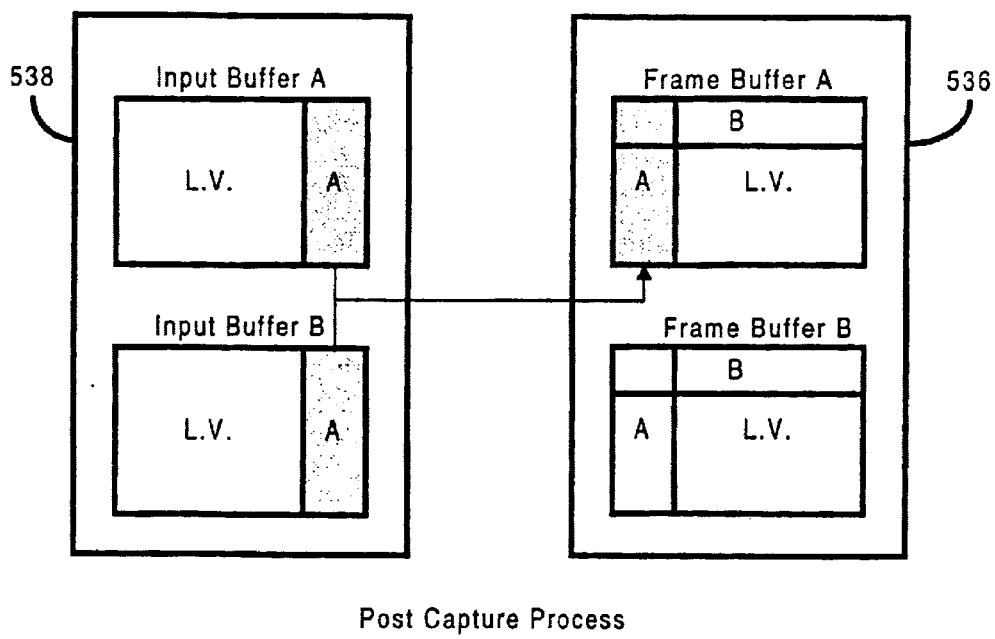

After the frame buffers A and B are divided into zones, the portions of any captured images that overlap the current pane are copied from memory 346 into their respective zones. For the current example, FIG. 12 shows that the overlap area 440c of image 3 is copied from memory 346 into zone A of Frame buffer A, while the overlap area 440d of image 2 is copied from memory 346 into zone B of Frame buffer A. As will be appreciated by one with ordinary skill in the art, the writing of the image data into the zones is order independent, e.g., zone A data can be written first followed by zone B data and vice versa.

Figure 13:
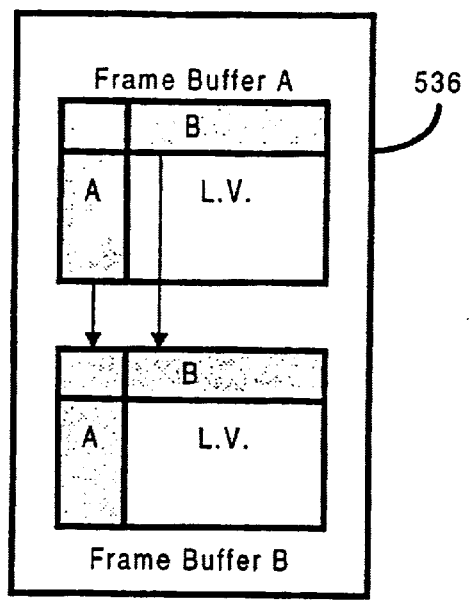

Referring now to FIG. 13, after the overlap areas of the previously captured images are copied to their respective zones in frame buffer A for output to zones A and B of the LCD 402, the data in zones A and B are copied to zones A and B of frame buffer B for output to zones A and B of the LCD 402. Alternatively, zones A and B in frame buffer B could be filled with the overlapping image data first, followed by a copy to frame buffer A. Next, the data for the live view zone of the LCD 402 must be processed.

Figure 14:
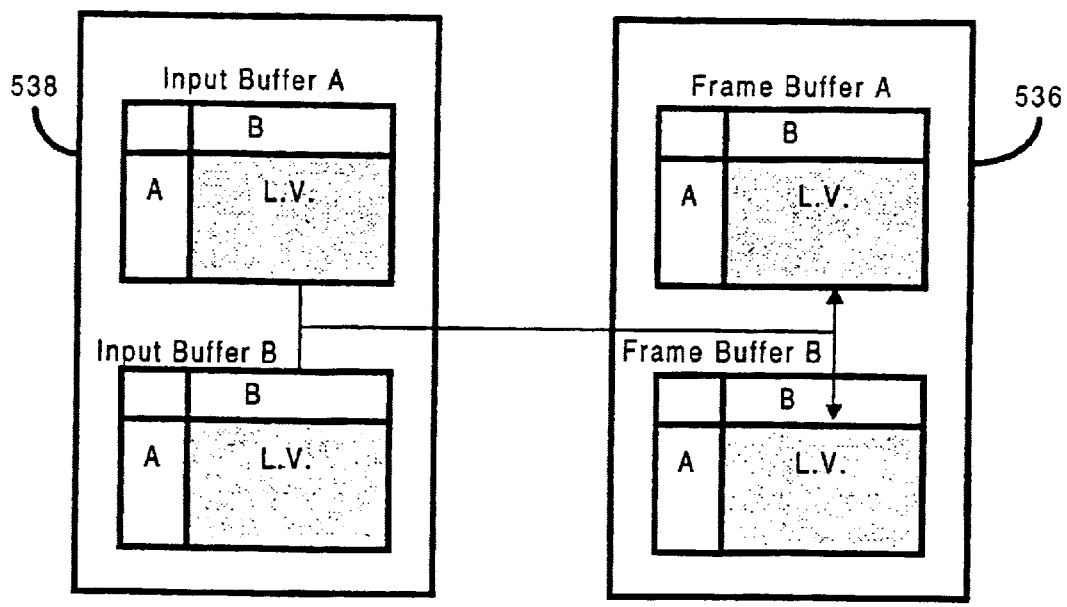

FIG. 14 is a block diagram illustrating the modified live view processing of the input buffers 538 and the frame buffers 536 during composite image capture. During modified live view processing, the input buffers A and B are filled with raw CCD data as usual but the data falling within zone A and B are not processed and transferred to the frame buffers 536 with the data in the live view zone.

If input buffer A is currently in a processing cycle, the CPU 344 processes the data from live view zone of input buffer A and transfers the data into live view zone of frame buffer A for output to live view zone of the LCD 402. If input buffer B is currently in a processing cycle, the CPU 344 processes the data from live view zone of input buffer B and transfers the data into live view zone of frame buffer B. This processing of live view zone data from the input buffers 538 to the frame buffers 536 continues until the last image in the composite image array captured. If the current image is not the last image, then the current image is captured, the overlap area of the newly captured image is saved in memory, and the above process is repeated.

A method and apparatus for capturing a multidimensional array of overlapping images for composite image generation has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for capturing a multidimensional array of overlapping images for composite image generation using a camera that includes a viewfinder, method comprising the steps of:

a) displaying to a user a plurality of composite image formats comprising N×M arrays of image panes;

b) allowing the user to select a composite image format from the plurality of composite image formats;

c) allowing the user to sequentially capture the images in the array; and d) in response to the user capturing one of the images in the array, displaying overlapping areas of previously captured images in the array in the viewfinder to enable the user to align the next image to be captured in the array with the previously captured images.

2. A method as in claim 1 wherein step c) further includes the steps of:

c1) selecting a first image in the N×M array to capture;

c2) capturing the first image; and c3) selecting a second image in the N×M array to capture, wherein the second image overlaps the first image in the N×M array.

3. A method as in claim 2 wherein the viewfinder is bounded by four edges, step d) further including the steps of:

d1) dividing the viewfinder into a first and a second zone in response to the user capturing the first image, wherein the first zone is adjacent to one of the four edges of the viewfinder;

d2) displaying a portion of the first image that is to overlap with the second image in the first zone; and d3) displaying a live view of the second image in the second zone to enable the user to align the second image with the first image.

4. A method as in claim 3 further including the step of: repeating steps c) through d) until all the images in the N×M array have been captured.

5. A method as in claim 4 further including the steps of: storing the captured images of the N×M array in an image file; and stitching the captured images to generated the composite image.

6. A method for capturing a multidimensional array of overlapping images for composite image generation using a camera, wherein the camera includes a viewfinder that is bounded by four edges, the method comprising the steps of:

a) providing a composite image format comprising an N×M array of image panes corresponding to a relative position of overlapping images, wherein each image pane overlaps at least two other image panes in the image format, and a current image pane corresponds to a position of an image to be captured;

b) selecting a first image in the N×M array to capture;

c) capturing the first image;

d) selecting a second image in the N×M array to capture, wherein the second image overlaps the first image in the N×M array;

e) determining how many (x) captured images overlap with the current pane and dividing the viewfinder into x zones and a live view zone, wherein each of the x zones is adjacent to one of the four edges of the viewfinder;

f) displaying portions of the overlapping images in their corresponding zones;

g) displaying a live view of the second image in the live view zone to enable the user to align the second image with the first image;

h) capturing the second image;

i) selecting a third image in the N×M array to capture, wherein the third image overlaps with either the first image or the second image in the N×M array; and j) repeating steps c) through i) until all the images in the N×M array have been captured.

7. A method as in claim 6 wherein step e) further includes the step of:

e1) indicating boundaries between the x zones and the live view zone in the viewfinder using contiguously shaped lines.

8. A method as in claim 7 wherein step a) further includes the step of:

a1) displaying a menu of a plurality of N×M composite image array formats from which a user may select.

9. A method as in claim 8 wherein step a) further includes the step of:

a2) entering values for N and M in order to select the composite image format.

10. A method as in claim 8 wherein step b) further includes the step of:

b1) setting the first image to capture as a default.

11. A method as in claim 8 wherein step b) further includes the step of:

b1) allowing the user to manually select the first image to capture.

12. A method as in claim 8 wherein step c) further includes the steps of:

c1) associating tags necessary for stitching with each captured image, wherein the tags include any combination of a designation of the composite image format, an identification of which image panes each captured image corresponds to, an order of image capture, a percentage of overlap, and a lens field of view; and c2) storing each captured image in a first file.

13. A method as in claim 6 wherein step e) further includes the step of:

e1) translucently displaying portions of the overlapping images over the live view image.

14. A digital camera comprising:

an imaging device for capturing image data;

a memory for storing the image data from the imaging device;

a viewfinder bounded by four edges; and processing means coupled to the imaging device, the memory and to the viewfinder, the processing means including means for providing a composite image format comprising an N×M array of image panes corresponding to a relative position of overlapping images, wherein each image pane overlaps at least two other image panes in the image format, and a current image pane corresponds to a position of an image to be captured;

means for selecting a first image in the N×M array to capture, means for capturing the first image, means for selecting a second image in the N×M array to capture, wherein the second image overlaps the first image in the N×M array, means for dividing the viewfinder into a first and a second zone in response to the user capturing the first image, wherein the first zone is adjacent to one of the four edges of the viewfinder, means for displaying a portion of the first image that is to overlap with the second image in the first zone, means for displaying a live view of the second image in the second zone to enable the user to align the second image with the first image, means for determining a number (x) of previously captured images that overlap the current pane, and means for dividing the viewfinder into the (x) number of zones and a live view zone, and means for displaying portions of the overlapping images in their corresponding zones.

15. The invention of claim 14 wherein the processor further includes means for indicating boundaries between the (x) number of zones and the live view zone in the viewfinder using contiguously shaped lines.

16. The invention of claim 15 wherein the processor further includes means for allowing a user to enter values for N and M so that the user can select the composite image format.

17. The invention of claim 14 wherein the processor further includes means for translucently displaying portions of the overlapping images over the live view image.

18. The invention of claim 14 wherein the processor further includes means for displaying a menu of a plurality of N×M composite image array formats from which a user may select.

19. The invention of claim 18 wherein the processor further includes means for allowing the user to manually select the first image to capture.

20. The invention of claim 18 wherein the processor further includes means for storing tags with each captured image, wherein the tags include a information necessary for stitching, the information including any combination of;

a designation of the composite image format, an identification of which image pane the captured images correspond to, an order of image capture, a percentage of image overlap, and a lens field of view.

21. The invention of claim 18 wherein the memory includes an input buffer and a frame buffer, and wherein the input buffer stores the image data from imaging device, the processing means functioning to perform color space conversion on the image data to provide processed image data, and to store the processed image data in the frame buffer for output to the viewfinder.

22. The invention of claim 21 wherein the frame buffer is divided into the (x) number of zones and the live view zone corresponding to the zones in the viewfinder, wherein the overlapping areas of previously captured images are transferred from memory to their respective zones in the frame buffer.

23. The invention of claim 22 wherein during a live view mode, the input buffer is divided into the (x) number of zones and the live view zone corresponding to the zones in the viewfinder, and wherein image data from the live view zone in the input buffer is transferred to the live view zone in the frame buffer for display.

24. The invention of claim 23 wherein the processing means comprises a software program.

25. The invention of claim 23 wherein the processing means comprises hardware.

26. The invention of claim 23 wherein the processing means comprises a combination of software and hardware.

27. The invention of claim 23 wherein the input buffer and frame are ping-pong buffers.

28. The invention of claim 18 wherein the processor further includes means for setting the first image to capture as a default.

* * * * *